3,116,970
PROCESS FOR THE REMOVAL OF ORGANIC SULPHUR COMPOUNDS FROM GASES

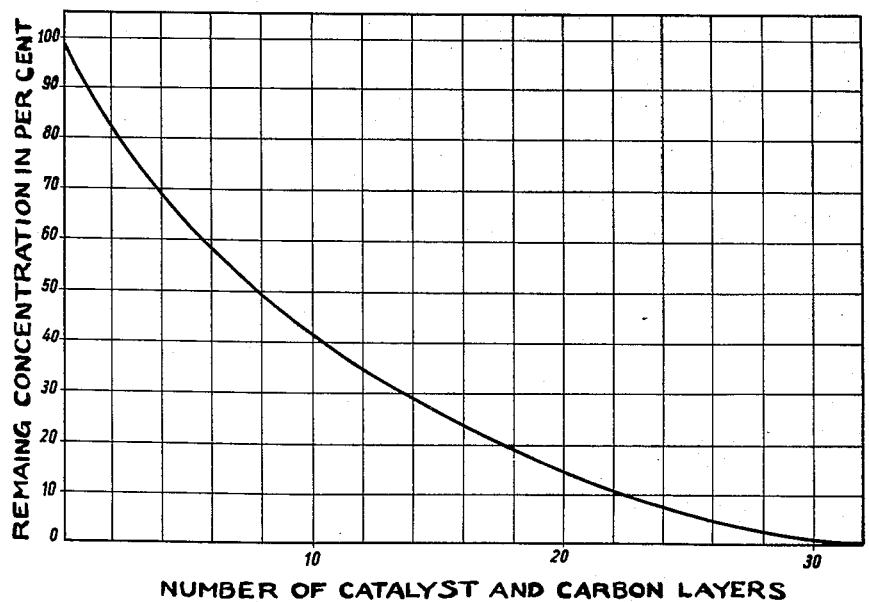

Klaus Storp, Frankfurt am Main, and Heinrich Kleemann, Walldorf, Hessen, Germany, assignors to Laboratorium für Adsorptionstechnik G.m.b.H., Frankfurt am Main, Germany, a corporation of Germany
Filed July 11, 1960, Ser. No. 41,825
Claims priority, application Germany Aug. 6, 1959
6 Claims. (Cl. 23—2)

This invention relates to a process for the removal of organic sulphur compounds from gases.

It is already known to oxidize hydrogen sulphide to elemental sulphur over active carbon in the presence of oxygen and to separate this sulphur by means of adsorption on the carbon. This process takes place preferably at temperatures between 100 and 120° C. It is furthermore known that organic sulphur compounds may be split hydrolytically to give hydrogen sulphide over catalysts in the presence of steam, wherein activated alumina in conjunction with thorium oxide or cerium oxide is usually employed as the catalyst. It would seem obvious, for the purpose of removing the organic sulphur compounds in gases, to split them catalytically over thorium or cerium oxide and then to separate the hydrogen sulphide formed by the hydrolysis by treatment with activated carbon. Such a method is uneconomical, however, since the hydrolysis reaction $$CS_2 + 2H_2O \rightarrow CO_2 + 2H_2S$$

is very dependent upon temperature. A 100% conversion does not take place until temperatures between 300 and 700° C. have been attained. At temperatures of 120 to 140° C., which in industry can still be attained by relatively simple means, only about 20 to 30% of the sulphur compounds can be split. The hydrolysis of the organic sulphur compounds is in consequence attended with high costs for heating the gases, which after hydrolysis have to be closed again to the temperature required for the treatment with active carbon.

The object of the invention is to find a method which allows the hydrolysis of the organic sulphur compounds to take place at a temperature which makes a subsequent cooling of the gases for the treatment with activated carbon unnecessary.

It has now been found that a 100% hydrolysis and separation of the organic sulphur compounds is obtained at temperatures below 150° C., for example between 120 and 140° C., when the gases are passed at these temperatures over a number of successive alternating layers of catalysts and active carbon, the conditions usual for the catalytic hydrolysis or the active carbon treatment being maintained in the separate layers, i.e. in the hydrolysis a sufficient content of water is provided and in the oxidation of the formed hydrogen sulphide stoichiometric amounts of oxygen are provided.

When operating according to the invention, the hydrogen sulphide formed in a catalyst layer is oxidized to elemental sulphur and separated on the following activated carbon layer. At 120° C. with, for example, times of 5–10 seconds contact with the layer, about 20% of the organic sulphur compounds are converted into hydrogen sulphide. The idea of the process is to disturb repeatedly the equilibrium of the hydrolysis reaction by continuous separation with activated carbon of the hydrogen sulphide formed and thus in the final result to achieve a 100% conversion and separation of the organic sulphur compounds by means of constant change of the type of treatment.

The depth of the separate layers is fixed from case to case according to the given conditions. Generally layers of a depth between 10 and 15 cm. are likely to be suitable. However, the depth of the layer may be both above and below these limiting figures.

The number of layers of the catalyst and the activated carbon which are successively and alternately employed depends upon the allowable content of residual sulphur. The diagram in the acompanying drawing shows how the concentration decreases as a function of the contact and adsorption layers used in the case of a contact time of 200 to 300 seconds for the whole run.

Since the activated carbon has not only the function of accelerating the oxidation of the hydrogen sulphide and binding the elemental sulphur formed, but also of preventing sublimation of the elemental sulphur in the following layer of catalyst, a highly active material with a relatively dense structure is advantageously used. A high-grade activated carbon can adsorb up to 80% of its weight of elemental sulphur at the given temperatures, whereby the proposed process offers substantial advantages as compared with the previous processes, in which at comparable low temperatures only 0.1 to 1% of sulphur is adsorbed and which consequently necessitate a regeneration after a very short time.

A further advantage of the process of the invention is the simultaneous separation of organic and inorganic sulphur compounds. Practically all commercial gases (e.g. hydrogen, nitrogen, water-gas, natural gas, carbon monoxide, carbon dioxide) may be purified. The requirements for the purity of the gas to be desulphurized (e.g. resin forming substances, etc.) are small, since the first carbon layer acts as a preliminary filter and therefore the subsequent layers only come in contact with largely purified gases.

All catalysts suitable for the hydrolysis of organic sulphur compounds may be used as the inorganic catalysts. Instead of activated carbon, sulphur-binding compositions or suitable washing agents may also be used.

The catalyst and activated carbon are advantageously placed in a cylindrical container on perforated plates arranged one above the other, at such an inclination to the base that the catalyst or adsorption means inserted on one side of the cylinder may be drawn off on the opposite side by simply sliding it off.

If the treatment of the gases to be desulphurized admits the use of pressure, the desulphurization is advantageously carried out under pressure.

Examples (1) Activated aluminum oxide, which contains 10% of thorium oxide, and commercial high-grade activated carbon (e.g. Supersorbon) were arranged in successive separated layers of equal size, and carbon dioxide which contained 100 mg. of carbon disulphide per cubic meter was passed through.

After passing through 20 layers each of catalyst composition and activated carbon at a working temperature between 130 and 140° C., the carbon disulphide was completely hydrolized and separated as elemental sulphur. At a space-velocity of 100, a volume of 10 cubic meters of catalyst-carbon was used.

With an amount of carbon of 1.5 tons which could take up 80% of sulphur, about 12 million cubic meters of gas could be purified according to the invention.

(2) During the processing of freshly precipitated aluminium hydroxide into alumina, 10% of cerium in the form of cerium nitrate was added to the mass. The composition was mixed, kneaded and pressed into balls. The balls were calcined until the cerium nitrate was converted into oxide. The product obtained was again placed alternately with high-grade granular activated carbon, in 20 layers of each, in a special purifying tower with obliquely placed plates.

A catalyst-carbon volume of 10 cubic meters was used with a space-velocity of 100, with which nitrogen, which contained 50 mg. of carbon disulphide per cubic meter was brought to synthesis purity at 135° C.

About 24 million cubic meters of gas could be passed through according to the invention before the carbon contained 80% sulphur.

(3) A pressure adsorber of 0.5 cubic meter content was filled with the catalyst and activated carbon described in Example 2 in 20 successive layers of each, and nitrogen containing 50 mg. of carbon disulphide in the standard cubic meter was passed over them at 20 atm. At an hourly rate of 50 cubic meters, 60,000 cubic meters of gas could be brought at 135° C. to synthesis purity.

(4) Activated aluminium oxide with a content of 10% of cerium oxide and commercial high-grade narrow-pored activated carbon were arranged in successive separated layers and coke oven gas was passed through. For the preliminary separation of the resin-forming substances, the first catalyst layer was a layer of highly active wide-pored activated carbon.

The coke oven gas had the following composition: 10 g. of organic sulphur, 1000 g. of benzene, 0.3 vol. percent of oxygen, 1 p.p.m. of nitric oxide and 10 g. of resin-forming substances per 100 cubic meters.

The operating temperature was 130–140° C. After the first carbon layer, the gas was passed through the other 20 layers each of catalyst composition and narrow-pored activated carbon. A volume of 15 cubic meters of catalyst-carbon was used at a space-velocity of 100.

The issuing gas was free from sulphur compounds, from resin-forming substances, and contained only 0.2 p.p.m. of nitric oxide. Using 3 tons of carbon and charging the preliminary layer of wide-pored activated carbon with 60% of resin-forming substances and the narrow-pored active carbon with 60% of sulphur, about 9 million cubic meters of gas can be purified according to the invention.

We claim:

1. A process for the removal of organic sulfur compounds selected from the group consisting of carbon disulfide and sulfur compounds as present in coke oven gases from gases, which comprises passing said gases, at temperatures of substantially 120–140° C. and in the presence of water and oxygen in the quantities required to carry out said process, over a plurality of successively arranged alternate layers of a catalyst and activated carbon, said catalyst consisting of activated aluminum oxide containing approximately 10 percent of a compound selected from the group consisting of thorium oxide and cerium oxide.

2. A process for the removal of organic sulfur compounds selected from the group consisting of carbon disulfide and sulfur compounds as present in coke oven gases from gases, which comprises passing said gases, at temperatures of substantially 120–140° C. and in the presence of water and oxygen in the quantities required to carry out said process, over a plurality of successively arranged alternate layers of a catalyst and activated carbon of dense structure, said catalyst consisting of activated aluminum oxide containing 10 percent of a compound selected from the group consisting of thorium oxide and cerium oxide.

3. A process for the removal of organic sulfur compounds selected from the group consisting of carbon disulfide and sulfur compounds as present in coke oven gases from gases which comprises passing said gases, at temperatures of substantially 120–140° C. and in the presence of water and oxygen in the quantities required to carry out said process, under pressure over a plurality of successively arranged alternate layers of a catalyst and activated carbon of dense structure, said catalyst consisting of activated aluminum oxide containing approximately 10 percent of a compound selected from the group consisting of thorium oxide and cerium oxide.

4. A process for the removal of organic sulfur compounds from gases, said sulfur compounds being selected from the group consisting of carbon disulfide and sulfur compounds as present in coke oven gases, which comprises passing said gases to be desulfurized, at temperatures of substantially 120 to 140° C. and in the presence of water and oxygen in the quantities required to carry out said process, over a plurality of successively arranged alternate layers of a catalyst and activated carbon, separated from each other, the first layer consisting of narrow-pored activated carbon thus acting as filter and largely purifying the gases to be desulfurized, said catalyst consisting of activated aluminum containing approximately 10 percent of a compound selected from the group consisting of thorium oxide and cerium oxide.

5. A process for the removal of organic sulfur compounds from gases, said sulfur compounds being selected from the group consisting of carbon disulfide and sulfur compounds as present in coke oven gases, which comprises passing said gases to be desulfurized, at temperatures of substantially 120 to 140° C. and in the presence of water and oxygen in the quantities required to carry out said process, over essentially 20 successively arranged alternate layers of activated carbon and a catalyst consisting of activated aluminum containing approximately 10 percent of a compound selected from the group consisting of thorium oxide and cerium oxide, the first said layer consisting of a narrow-pored activated carbon thus acting as a filter and largely purifying the gases to be desulfurized.

6. A process for the removal of organic sulfur compound from gases, said sulfur compounds being selected from the group consisting of carbon disulfide and sulfur compounds as present in coke oven gases, which comprises passing said gases to be desulfurized, at temperatures of substantially 120 to 140° C. and in the presence of water and oxygen in the quantities required to carry out said process, over essentially 20 successively arranged alternate layers of activated carbon having a dense structure and of a catalyst consisting of activated aluminum containing approximately 10 percent of a compound selected from the group consisting of thorium oxide and serium oxide, the first said layer consisting of a narrow-pored activated carbon thus acting as a filter and largely purifying the gases to be desulfurized.

References Cited in the file of this patent

UNITED STATES PATENTS

| | | |
|---|---|---|
| 1,430,920 | Mittasch et al. | Oct. 3, 1922 |
| 1,916,824 | Braus | July 4, 1933 |
| 2,442,982 | Nachod | June 8, 1948 |

FOREIGN PATENTS

| | | |
|---|---|---|
| 130,654 | Great Britain | Aug. 14, 1919 |
| 172,074 | Great Britain | Nov. 21, 1921 |
| 561,679 | Great Britain | May 31, 1944 |